United States Patent
Webb et al.

(10) Patent No.: US 10,524,283 B2
(45) Date of Patent: Dec. 31, 2019

(54) TELECOMMUNICATIONS APPARATUS AND METHODS

(71) Applicant: SONY CORPORATION, Tokyo (JP)

(72) Inventors: Matthew William Webb, Basingstoke (GB); Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 198 days.

(21) Appl. No.: 14/916,016

(22) PCT Filed: Jun. 26, 2014

(86) PCT No.: PCT/EP2014/063521
§ 371 (c)(1),
(2) Date: Mar. 2, 2016

(87) PCT Pub. No.: WO2015/043778
PCT Pub. Date: Apr. 2, 2015

(65) Prior Publication Data
US 2016/0219614 A1    Jul. 28, 2016

(30) Foreign Application Priority Data
Sep. 25, 2013  (EP) .................................... 13185922

(51) Int. Cl.
*H04W 72/12*  (2009.01)
*H04W 72/04*  (2009.01)

(52) U.S. Cl.
CPC ..... *H04W 72/1268* (2013.01); *H04W 72/048* (2013.01); *H04W 72/0446* (2013.01); *H04W 72/121* (2013.01)

(58) Field of Classification Search
None
See application file for complete search history.

(56) References Cited

U.S. PATENT DOCUMENTS

| 2009/0086673 A1* | 4/2009 | Aminaka ............ H04W 74/008 370/329 |
| 2009/0180414 A1 | 7/2009 | Maeda et al. |

(Continued)

FOREIGN PATENT DOCUMENTS

| GB | 2487757 A | 8/2012 |
| GB | 2487780 A | 8/2012 |

(Continued)

OTHER PUBLICATIONS

International Search Report dated Oct. 2, 2014 in PCT/EP/2014/063521 filed Jun. 26, 2014.

(Continued)

*Primary Examiner* — Christopher M Crutchfield
*Assistant Examiner* — Alan L Lindenbaum
(74) *Attorney, Agent, or Firm* — Xsensus LLP

(57) ABSTRACT

A wireless telecommunications system that supports a virtual carrier mode operation in which downlink communications are made by a base station while a terminal device receives at least some communications from the base station within a restricted subset of transmission resources. When there is to be a change in system information, the base station transmits to the terminal device an indication that updated system information is to be broadcast by the base station to plural terminal devices and the terminal device seeks to acquire the updated system information using the restricted subset of transmission resources. The base station further conveys to the terminal device an allocation of uplink transmission resources for acknowledgement signalling for the updated system information and the terminal device responds by using the allocated uplink transmission resources to convey to the base station an indication whether or not the terminal device has acquired the updated system information.

18 Claims, 6 Drawing Sheets

(56) References Cited

U.S. PATENT DOCUMENTS

| | | | | |
|---|---|---|---|---|
| 2009/0257390 | A1* | 10/2009 | Ji | H04W 72/082 |
| | | | | 370/329 |
| 2011/0194515 | A1* | 8/2011 | Nakao | H04L 5/0053 |
| | | | | 370/329 |
| 2011/0310769 | A1* | 12/2011 | Lee | H04W 4/70 |
| | | | | 370/254 |
| 2012/0170485 | A1 | 7/2012 | Maeda et al. | |
| 2012/0176975 | A1* | 7/2012 | Choi | H04W 48/12 |
| | | | | 370/329 |
| 2012/0327895 | A1* | 12/2012 | Wallen | H04W 48/12 |
| | | | | 370/330 |
| 2014/0307698 | A1 | 10/2014 | Beale | |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |

OTHER PUBLICATIONS

"Digital cellular telecommunications system (Phase 2+); Universal Mobile Telecommunications System (UMTS); LTE; Service requirements for Machine-Type Communications (MTC); Stage 1" (3GPP TS 22.368 version 11.6.0 Release 11) ETSI TS 122 368 V11.6.0, Sep. 2012, 21 Pages.

Harri Holma, et al., "LTE for UMTS OFDMA and SC-FDMA Based Radio Access" John Wiley and Sons, 2009, pp. 25-27 and Cover Page.

"LTE; Evolved Universal Terrestrial Radio Access (E-UTRA); Radio Resource Control (RRC); Protocol specification" (3GPP TS 36.331 version 11.4.0 Release 11) ETSI TS 136 331 V11.4.0, Jul. 2013, 350 Pages.

U.S. Appl. No. 14/916,117, filed Mar. 2, 2016, Brian Alexander Martin, et al.

* cited by examiner

TELECOMMUNICATIONS APPARATUS AND METHODS

CROSS-REFERENCE TO RELATED APPLICATIONS

The present application is based on PCT filing PCT/EP2014/063521 filed Jun. 26, 2014, and claims priority to European Patent Application 13 185 922.5, filed in the European Patent Office on Sep. 25, 2013, the entire contents of each of which being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present disclosure relates to wireless telecommunications systems and methods, and in particular to systems and methods for restricted frequency resource/virtual carrier operation in wireless telecommunication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example of potential MTC device applications. Further information on characteristics of MTC-type devices can be found, for example, in the corresponding standards, such as ETSI TS 122 368 V11.6.0 (2012-09)/3GPP TS 22.368 version 11.6.0 Release 11) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [2], GB 2 487 908 [3], GB 2 487 780 [4], GB 2 488 513 [5], GB 2 487 757 [6], GB 2 487 909 [7], GB 2 487 907 [8] and GB 2 487 782 [9]. One principle underlying the concept of a virtual carrier is that a frequency subregion (subset of frequency resources) within a wider bandwidth (greater range of frequency resources) host carrier is configured for use as a self-contained carrier for at least some types of communications with certain types of terminal device.

In some implementations, such as described in references [2] to [9], all downlink control signalling and user-plane data for terminal devices using the virtual carrier are conveyed within the subset of frequency resources associated with the virtual carrier. A terminal device operating on the virtual carrier is made aware of the restricted frequency resources and need only receive and decode a corresponding subset of transmission resources to receive data from the base station. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

Other virtual carrier approaches for reducing the required complexity of devices configured to communicate over LTE-type networks are proposed in GB 2 497 743 [10] and GB 2 497 742 [11]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted subset of carriers which is smaller than and within the set of subcarriers comprising the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency resource, and as such need only buffer and process data within this frequency resource during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequency resources for the higher-layer data. This approach may sometimes be referred to as a "T-shaped" allocation because the area of the downlink time-frequency resource grid to be used by the reduced-capability terminal device may in some cases comprise a generally T-shape.

Virtual carrier concepts thus allow terminal devices having reduced capabilities, for example in terms of their transceiver bandwidth and/or processing power, to be supported within LTE-type networks. As noted above, this can be useful for to allow relatively inexpensive and low complexity devices to communicate using LTE-type networks. However, providing support for reduced capability devices in a wireless telecommunications system which is generally based around existing standards can require additional considerations for some operational aspects of wireless telecommunications systems to allow the reduced-capability terminal devices to operate in conjunction with conventional terminal devices.

One area where the inventors have recognised a need for new procedures concerns the acquisition of system information, and in particular where there has been a change in system information. In broad summary, system information, or at least some aspects of system information, in existing wireless telecommunications systems, such as LTE-based telecommunications systems, is transmitted for all terminal devices in a broadcast manner. A reduced capability device that is required to obtain new system information must receive and decode these broadcasts. The need to acquire system information impacts the ability of the reduced-capability terminal device to receive dedicated transmissions during the period it is acquiring new system information and consequently impacts the way in which transmissions can be scheduled for reduced-capability terminal devices.

There is therefore a need for schemes which allow system information to be communicated to terminal devices operating on restricted downlink frequency resources in wireless telecommunications systems in a manner which can help reduce the impact of acquiring system information on other operational aspects of the system.

SUMMARY

According to a first aspect of the present disclosure, there is provided a method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, the method comprising: seeking to acquire updated system information broadcast by the base station to a plurality of terminal devices using the restricted subset of transmission resources; receiving an allocation of uplink transmission resources from the base station; and conveying to the base station using the allocated uplink transmission resources an indication of whether or not the terminal device has acquired the updated system information.

According to a second aspect of the present disclosure, there is provided a terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, wherein the terminal device comprises: a controller unit configured to cause a transceiver unit to seek to acquire updated system information broadcast by the base station to a plurality of terminal devices using the restricted subset of transmission resources; to receive an allocation of uplink transmission resources from the base station; and to convey to the base station using the allocated uplink transmission resources an indication of whether or not the terminal device has acquired the updated system information.

According to a third aspect of the present disclosure, there is provided a method of operating a base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a downlink channel having a channel bandwidth which is smaller than the system frequency bandwidth, the method comprising: broadcasting updated system information to a plurality of terminal devices using the restricted subset of transmission resources for the terminal device; transmitting an allocation of uplink transmission resources to the terminal device; and receiving from the terminal device using the allocated uplink transmission resources an indication of whether or not the terminal device has acquired the updated system information.

According to a fourth aspect of the present disclosure, there is provided a base station for use in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a downlink channel having a channel bandwidth which is smaller than the system frequency bandwidth, wherein the base station comprises: a controller unit configured to cause a transceiver unit to broadcast updated system information to a plurality of terminal devices using the restricted subset of transmission resources for the terminal device; to transmit an allocation of uplink transmission resources to the terminal device; and to receive from the terminal device using the allocated uplink transmission resources an indication of whether or not the terminal device has acquired the updated system information.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
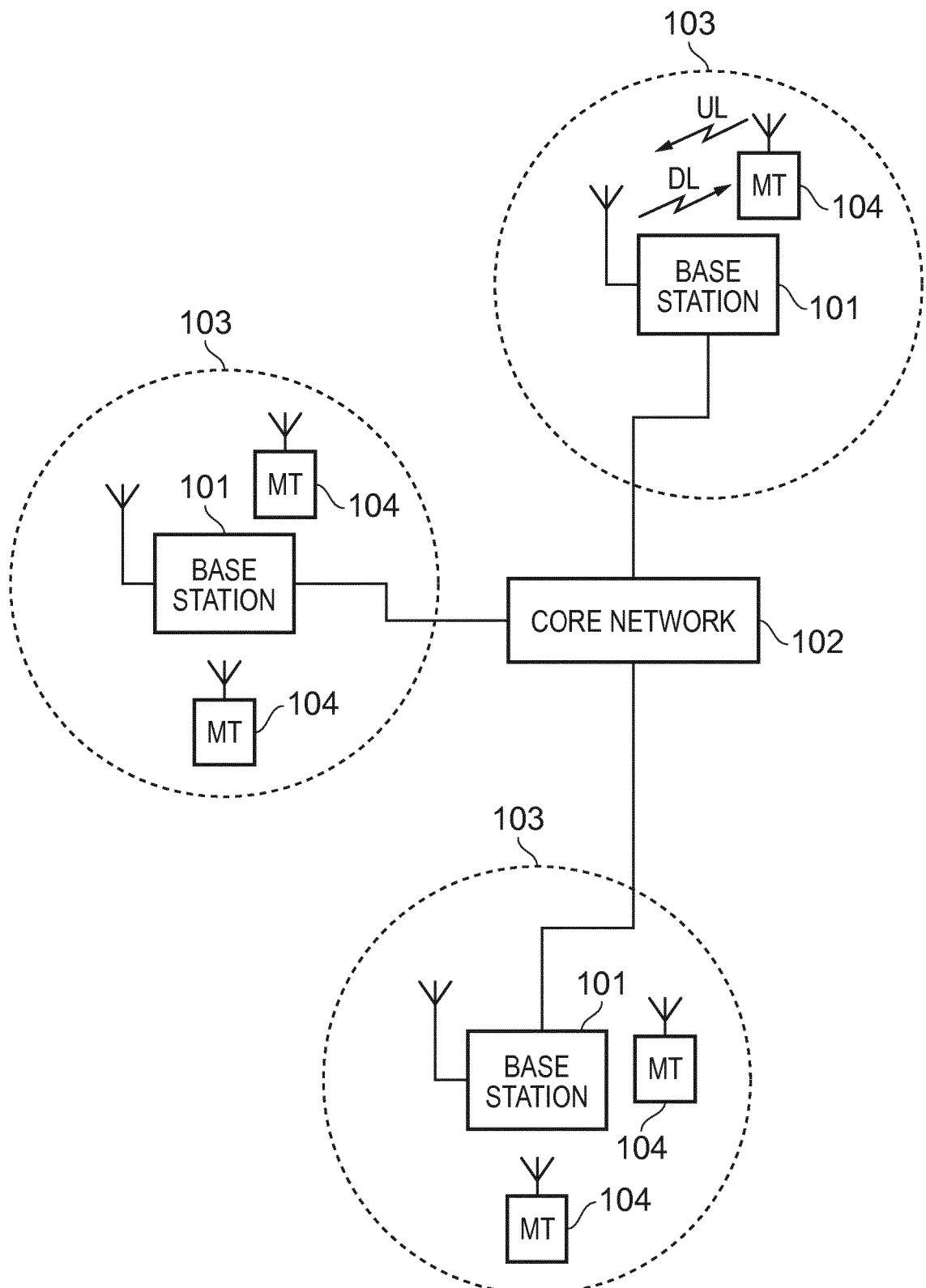
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP® body and also described in many books on the subject, for example, Holma, H. and Toskala, A. [12].

The network 100 includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
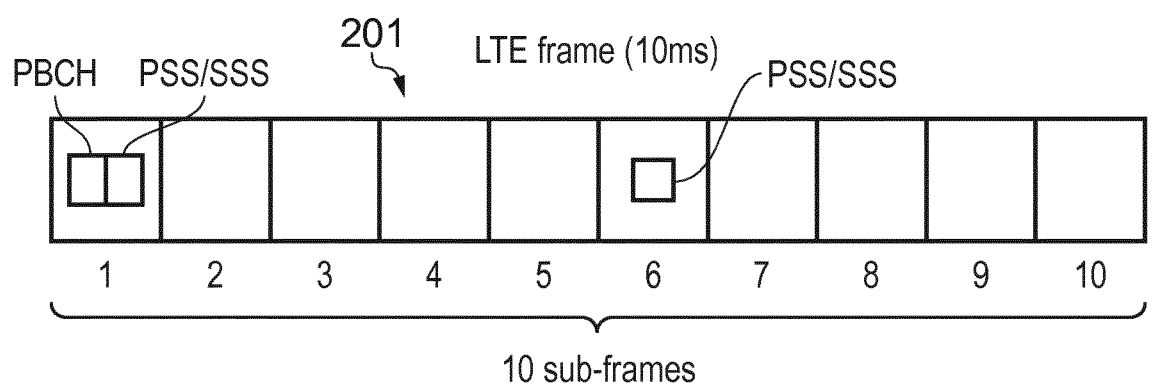
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
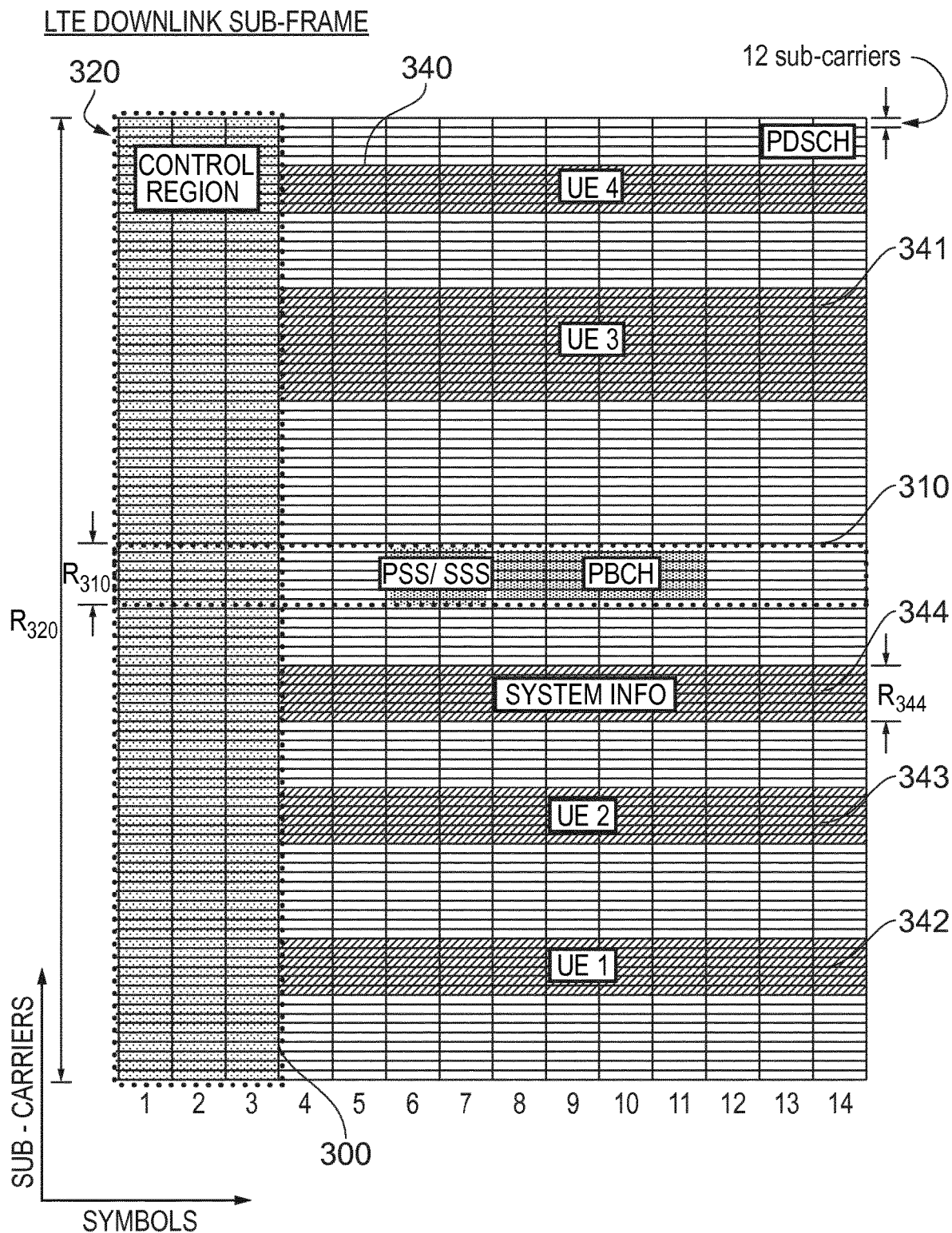
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344.

A conventional LTE frame will also include reference signals which are not shown in FIG. 3 in the interests of clarity.

Figure 4:
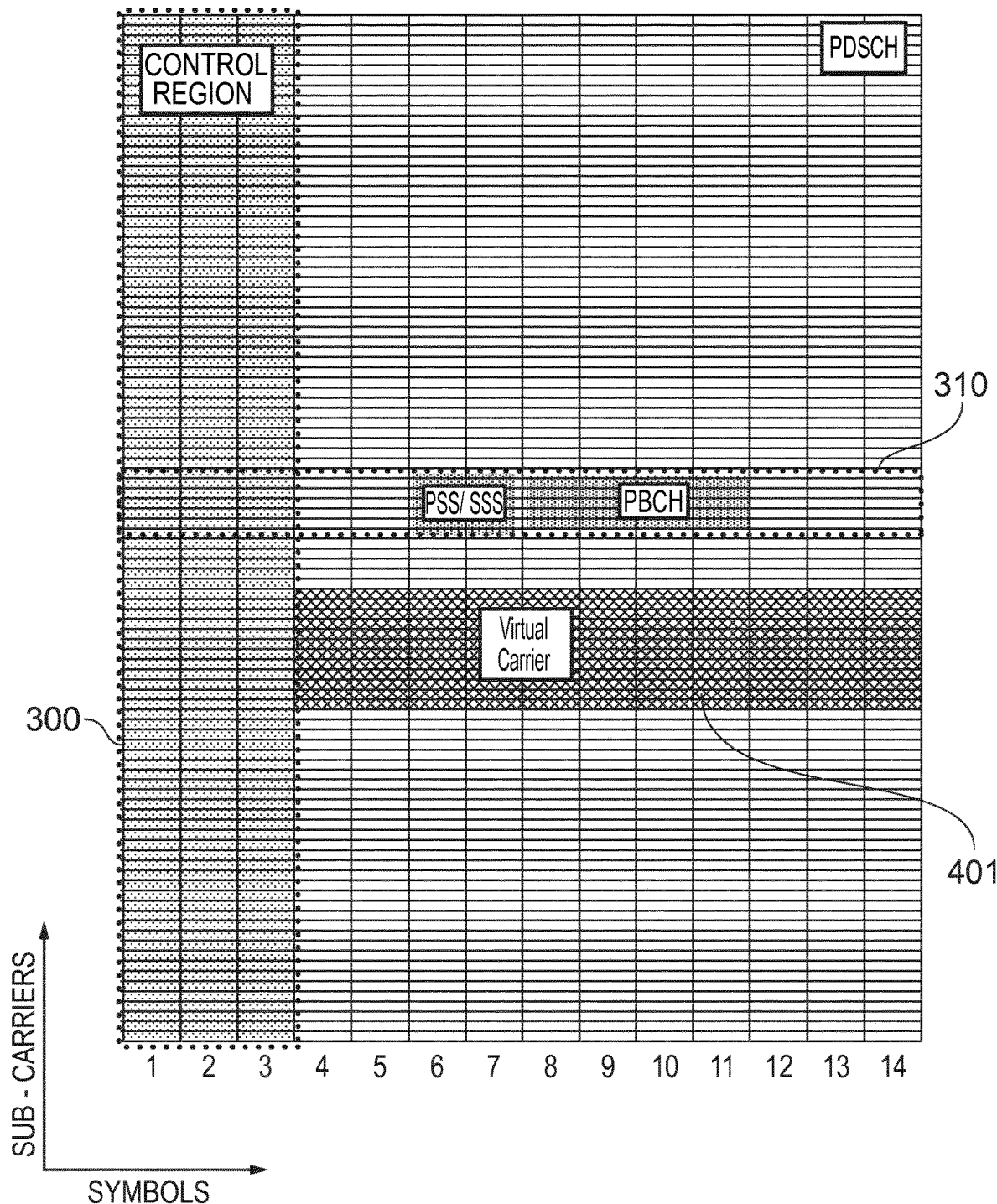
FIG. 4 schematically represents some aspects of a LTE downlink radio subframe structure associated with a host carrier supporting a virtual carrier.

FIG. 4 is a diagram which is similar to and will in many respect be understood from FIG. 3. However, FIG. 4 differs from FIG. 3 in schematically representing a downlink radio subframe corresponding to a host carrier in which a virtual carrier 401 (VC) is supported. The general operation of the virtual carrier represented in FIG. 4 may be in accordance with previously-proposed schemes, for example as described in any of the above-identified documents [2] to [11]. The virtual carrier thus represents a restricted subset of downlink transmission resources within the overall transmission resource grid associated with the host carrier which may be used for communicating at least some information with certain types of terminal devices, for example, reduced capability machine type communication terminal devices.

Thus, a conventional (i.e. non-reduced capability) terminal device may be supported using the full bandwidth of the resource grid represented in FIG. 4 in accordance with conventional LTE techniques. Downlink communications for a reduced-capability terminal device, on the other hand, may be restricted to a subset of transmission resources within the virtual carrier.

In some cases the entirety of the downlink communications for the reduced-capability terminal device (i.e. including control signalling and higher layer/user-plane data) may be conveyed within the transmission resources of one of the virtual carriers, for example in accordance with the principles proposed in the above-identified documents [2] to [9]. This may be appropriate, for example, for a terminal device which cannot receive the full bandwidth of the host carrier (and hence cannot receive the entirety of the control region 300).

In other cases the reduced-capability terminal device may be able to receive the full-bandwidth of the host carrier (and hence receive and decode the control region 300), but may be restricted as to its ability to buffer and decodes the entirety of the PDSCH region, and so may buffer and decode only a subset of the downlink transmission resources spanning the virtual carrier to which the terminal device has been allocated, for example in accordance with the "T-shaped allocation" principles proposed in the above-identified documents [10] and [11]. While this mode of operation may be referred to as a "T-shaped allocation" mode of operation for ease of reference, the PDSCH resources allocated to the reduced-capability terminal device need not be contiguous in frequency. That is to say that while the virtual carrier resources schematically represented in FIG. 4 are shown as a continuous block, in some examples the restricted subset of resources may be a subset of OFDM carriers distributed (spread) across the system bandwidth. Furthermore, it will be appreciated the subset of OFDM subcarriers comprising a virtual carrier for one particular terminal device may be different from a subset of OFDM subcarriers associated with supporting virtual carrier operation for another terminal device.

As noted above, virtual carrier operation can have an impact on how system information changes can be received by a reduced-capability terminal device.

In an LTE-based wireless telecommunications system some of the fundamental information required for a terminal device to operate in a cell is transmitted on PBCH in the Master Information Block (MIB). Other information regarding the system configuration is divided among System Information Blocks (SIBs) referred to as SIB1, SIB2, SIB3, . . . etc. (there are 16 SIBs defined as of Release 11 LTE). The SIBs are transmitted in system information (SI) messages, which, apart from SIB1, may contain multiple SIBs. There may be one or several SI messages transmitted at different periodicities. Each SI message may convey multiple SIBs suitable for scheduling with the same periodicity. The timings for SIB1 transmissions are fixed on an 80 ms period and they occur in the fifth subframe of radio frames when System Frame Number (SFN) is a multiple of 8 (i.e. SFN mod 8=0). There are retransmissions of SIB1 provided in every other radio frame within the 80 ms period. The timings for other SIB transmissions are configured in SIB1. The transmission resource allocations for the SI messages on PDSCH within a subframe are provided to terminal devices using PDCCH allocation messages addressed to SI-RNTI (System Information Radio Network Temporary identifier—currently 0xFFFF in LTE). At higher layers, SI is carried on the logical broadcast control channel (BCCH).

The system information in a cell may be changed, although typically this happens rarely with system information perhaps remaining unchanged for hours, days, or even weeks.

For changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q. When there is a change in system information, the new system information is transmitted from the start of a new SI modification period.

The general process for implementing a change in system information in an LTE-based network is described, for example, in Section 5.2.1.3 of ETSI TS 136 331 V11.4.0 (2013-07)/3GPP TS 36.331 version 11.4.0 Release 11 [13]. In summary, a base station indicates a change of system information as follows.

1. When the network changes system information it notifies terminal devices about the change by transmitting a PDCCH resource allocation message addressed to the paging RNTI (P-RNTI). This directs the terminal devices to decode PDSCH resources containing a Paging message with a SystemInfoModification flag set to true. This may be done, for example, throughout one SI modification period. Both RRC_IDLE and RRC_CONNECTED terminal devices check for paging messages periodically. It may be noted that EAB alterations, ETWS and CMAS notifications may be separately modified with separate flags in a paging message (but can also be modified along with other SIBs).

2. In a following SI modification period, the network transmits the modified system information, and may increment a SystemInfoValueTag in SIB1. This value tag can indicate changes in any SIB, but it might not be used for EAB, ETWS, CMAS and some regularly changing SI parameters such as CDMA2000 system time. Terminal devices can use SystemInfoValueTag to verify if currently stored system information is still valid, for example on return from being out of coverage when the UE may have missed a system information change notification in paging.

More details on system information and changes in system information in an LTE-based system can be found in ETSI TS 136 331 V11.4.0 (2013-07)/3GPP TS 36.331 version 11.4.0 Release 11 [13].

As discussed above, it has been proposed to reduce the complexity of an LTE modem by reducing the baseband bandwidth over which certain types of terminal device operate. In particular, it may be desirable to reduce at least the baseband bandwidth over which the terminal device is to receive PDSCH (i.e. using T-shaped allocation virtual carrier techniques). This can have the advantages of lowering the complexity of subframe buffering, post-FFT buffering, channel estimation, and turbo decoding; and lower complexity creates an opportunity for lower modem cost and also reduced operational power consumption. Low complexity modems are particularly attractive for use in machine-type communication (MTC) terminal devices.

Such a reduced-capability terminal device might, for example, be adapted to receive PDCCH across a full system bandwidth spanning n physical resource blocks (PRBs), e.g. n=50 PRBs for a system bandwidth of 10 MHz at baseband. However, the terminal device might be adapted to receive PDSCH in a maximum of m PRBs, where m is less than n. For example m=6, corresponding to an effective bandwidth of 1.4 MHz at baseband for PDSCH.

The buffering requirements can be reduced if the UE is given an indication of which m PDSCH PRBs it must buffer before it needs to decode them, so that a buffer suitable for 6 instead of 50 PRBs can be provided. Since the RF bandwidth is not changed, these 6 PDSCH PRBs could be anywhere within the system bandwidth and, in general, might be contiguous or non-contiguous in frequency per subframe. In the subframe in which PDSCH decoding occurs, PDCCH can schedule any subset or the whole of the 6 PRBs since all 6 have been buffered by the UE. Some example techniques for establishing the predetermined sub- set of PDSCH resources to buffer at the terminal device can be found in GB 2 497 743 [10] and GB 2 497 742 [11], but in general any suitable technique can be used.

The restricted subset of transmission resources on which a reduced-capability terminal device can receive PDSCH in a given subframe impacts how system information messages should be handled in the wireless telecommunications system. A PDCCH resource allocation to SI-RNTI to indicate a change in system information is transmitted in the PDCCH common search space, and therefore all terminal devices receive the relevant SIBs using the same PDSCH resources (at least for system information which is relevant for all terminal devices). To be receivable by a reduced-capability terminal device, the SIBs should be scheduled on physical resource blocks which the reduced-capability terminal device will buffer in the relevant subframe. Furthermore, this will be a restricted number of PRBs, e.g. requiring SIBs to be transmitted within m (e.g. m=6) PRBs.

However, the base station also needs send user data to reduced capability (low complexity) terminal devices using the restricted subset of PDSCH resources for the terminal device. To help increase the number of reduced-capability terminal devices that can be supported in a network and overall scheduling flexibility, it can be helpful if different reduced-capability terminal devices can operate using different restricted subsets of transmission resources. This means the PDSCH resource blocks which different terminal devices are buffering to receive their own user data will not in general be the same resource blocks in which system information (SIBs) is sent. The previously proposed schemes for virtual carrier operation have addressed how a terminal device can acquire system information when attaching to a network, notwithstanding the terminal device's ability to decode only a restricted subset of PDSCH resources in a given subframe. However, different techniques may be needed when a reduced-capability terminal device is to acquire new system information, for example because of a change in system information, while it is connected to the network (e.g. in RRC connected mode).

Figure 5:
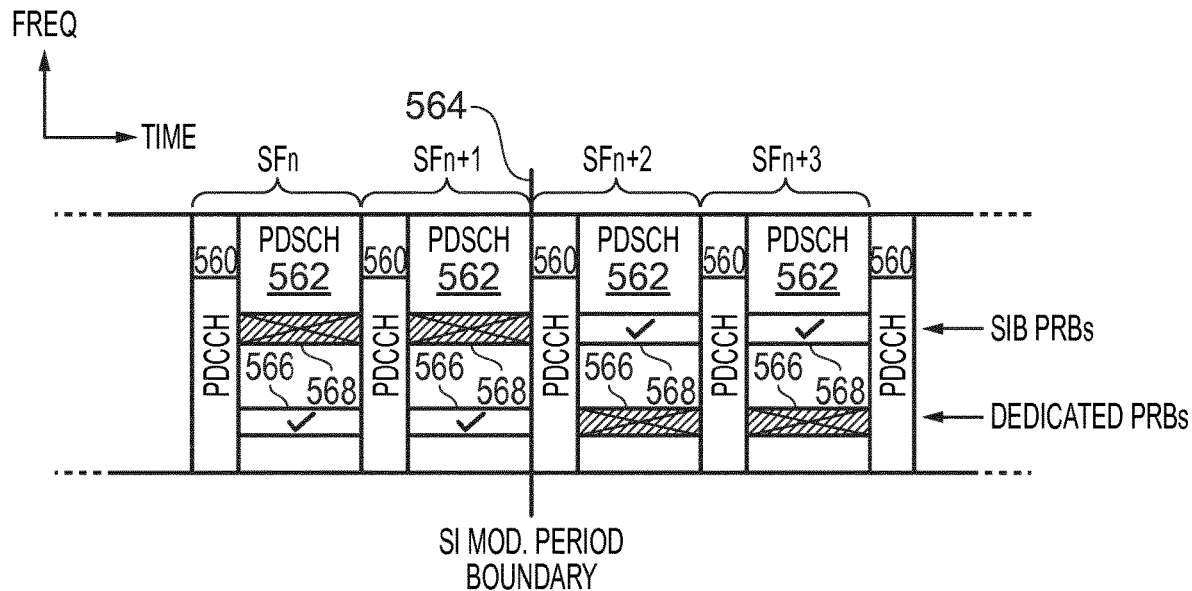
FIG. 5 schematically represents some aspects of a series of radio subframes spanning a system information modification period boundary for a host carrier supporting a virtual carrier.

FIG. 5 schematically represents a downlink frequency resource grid spanning four subframes labelled as SFn, SFn+1, SFn+2 and SFn+3 for an LTE-based wireless telecommunications system supporting a virtual carrier mode of operation in which a reduced-capability terminal device is restricted to buffering a subset of PDSCH resources while being able to receive the full bandwidth of PDCCH resources. As described above, each subframe comprises a PDCCH region 560 and a PDSCH region 562. Subframes SFn+1 and SFn+2 are assumed to span a system information modification period boundary 564, as schematically represented in the figure. Schematically represented in the PDSCH region of each subframe is an indication of the subset of transmission resources 566 which an example reduced-capability terminal device would use if it were receiving a user-plane data. These may be referred to as dedicated physical resource blocks for the reduced-capability terminal device. Also schematically represented in the PDSCH region of each subframe is an indication of the transmission resources 568 the base station would use if it were transmitting system information blocks in the relevant subframe. These may be referred to as SIB physical resource blocks. It will be appreciated the respective sets of transmission resources 566, 568 are shown as contiguous blocks occurring at the same place in each subframe purely for ease of representation. In practice the resources 566 comprising the dedicated PRBs for the reduced-capability terminal device may not be contiguous and their position and frequency may change in different subframes. Likewise for the resources 566 comprising the SIB PRBs (i.e. they may in general be scheduled on different frequency resources in each subframe).

In subframes SFn and SFn+1 the reduced-capability terminal device is assumed to be operating in a known "T-shaped" virtual carrier mode of operation in which it buffers the full PDCCH region 560 and the restricted subset of PDSCH transmission resources 566 established for dedicated user-plane data transmissions for the reduced-capability terminal device. While the device is buffering the dedicated PRBs 566 it is unable to buffer the transmission resources 568 used by the network for transmitting system information. This is schematically represented in FIG. 5 by a tick mark in the PDSCH transmission resources 566 comprising the dedicated PRBs and a cross mark and shading in the PDSCH resources 568 comprising the SIB PRBs.

In the schematic example represented in FIG. 5 it is assumed the base station is to make a change to system information at the system information modification period boundary 564 between subframes SFn+1 and SFn+2. The reason for the system information change in any given implementation is not significant to the operation of embodiments of the disclosure.

A reduced-capability terminal device can receive a system information change notification from a base station in the same way as for a conventional terminal device in the conventional manner discussed above. Established techniques can also be used to inform the terminal device of the transmission resources used for transmitting system information (i.e. the resources 568 identified in FIG. 5 as SIB PRBs).

However, an issue arises in that the reduced-capability terminal device must change (at least some of) the PRBs it is buffering from the dedicated PRBs 566 to the SIB PRBs 568 following the SI modification period boundary 564 if it is to receive the updated system information. This is schematically represented in FIG. 5 by a tick mark in the PDSCH transmission resources 568 comprising the SIB PRBs and a cross mark and shading in the PDSCH resources 566 comprising the dedicated PRBs.

While the reduced-capability terminal device is receiving SIB transmissions the extent to which it can receive dedicated transmissions is reduced. In principle the base station may simply take this into account when scheduling dedicated transitions to the reduced-capability terminal devices in the network when there has been a change in system information. However, a problem with this is the base station will not be aware of when the terminal device(s) have acquired the new system information and so are ready to return to receiving dedicated transmissions on the relevant restricted subset of transmission resources.

The inventors have identified various mechanisms for handling this issue. One simple solution would be to simply ensure the subset of PDSCH resources to be buffered by all reduced-capability terminal devices includes the transmission resources to be used for transmitting system information. However, it can be expected this approach will lead to an inefficient use of resources with high latencies and place restrictions on the number of reduced-capability terminal devices that can be supported in the network and the data throughput that can be provided for such terminal devices. Another simple solution would be for the base station to in effect ignore the fact the reduced-capability terminal devices will be unable to receive dedicated transmissions while they are acquiring new system information. That is to say, the base station may simply continue scheduling user data transmissions for the reduced-capability terminal devices following the change in system information. The terminal devices will not be able to receive these scheduled transmissions (because they will be instead buffering the physical resource blocks used for SIB transmissions). Consequently, the reduced-capability terminal devices will not acknowledge the dedicated transmissions scheduled by the base station while they are acquiring system information. Existing techniques (e.g. HARQ and RLC ARQ) for dealing with failed transmissions may then seek to recover the situation. In practice, this might involve the base station repeating the unacknowledged dedicated transmissions in subsequent subframes until an acknowledgement of successful transmission is received when the reduced-capability terminal device has acquired the new system information and returned to buffering and decoding the PRBs used for dedicated transmissions. However, this approach results in wasted transmissions.

Another approach the inventors have conceived of involves a wireless telecommunications system configured such that a reduced-capability terminal device is adapted to respond to a system information change notification by seeking to acquire the new system information and subsequently indicating to the base station in response to a message from the base station whether or not the new system information has been successfully acquired. Based on acknowledgement signalling received from the terminal device the base station can determine whether or not the reduced-capability terminal device is ready to receive dedicated user-plane transmissions or whether the reduced-capability terminal device is still in the process of acquiring the new system information.

Figure 6:
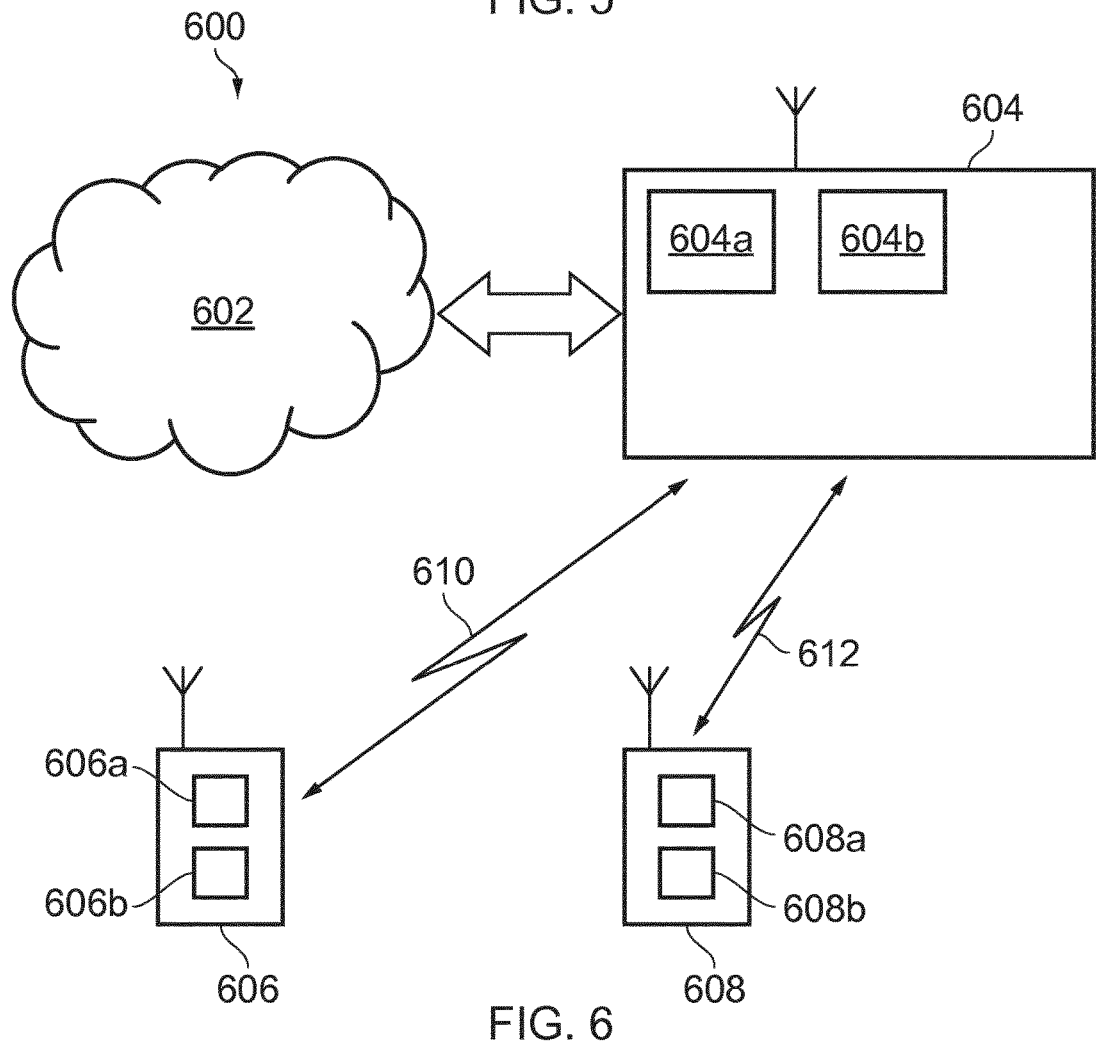
FIG. 6 schematically represents an adapted LTE-type wireless telecommunications system arranged in accordance with an example of the present disclosure.

FIG. 6 schematically shows a telecommunications system 600 according to an embodiment of the present disclosure. The telecommunications system 600 in this example is based broadly around an LTE-type architecture which supports virtual carrier operations such as discussed above. Many aspects of the operation of the telecommunications system 600 are known and understood and are not described here in detail in the interest of brevity. Operational aspects of the telecommunications system 600 which are not specifically described herein may be implemented in accordance with any known techniques, for example according to the current LTE-standards with modifications as appropriate to incorporate virtual carrier operation, such as disclosed in GB 2 487 906 [2], GB 2 487 908 [3], GB 2 487 780 [4], GB 2 488 613 [5], GB 2 487 757 [6], GB 2 487 909 [7], GB 2 487 907 [8], GB 2 487 782 [9], GB 2 497 743 [10] and GB 2 497 742 [11], the entire contents of which are incorporated herein by reference.

The telecommunications system 600 comprises a core network part (evolved packet core) 602 coupled to a radio network part. The radio network part comprises a base station (evolved-nodeB) 604 coupled to a plurality of terminal devices. In this example, two terminal devices are shown, namely a first terminal device 606 and a second terminal device 608. It will of course be appreciated that in practice the radio network part may comprise a plurality of base stations serving a larger number of terminal devices across various communication cells. However, only a single base station and two terminal devices are shown in FIG. 6 in the interests of simplicity.

As with a conventional mobile radio network, the terminal devices 606, 608 are arranged to communicate data to and from the base station (transceiver station) 604. The base station is in turn communicatively connected to a serving gateway, S-GW, (not shown) in the core network part which is arranged to perform routing and management of mobile communications services to the terminal devices in the telecommunications system 600 via the base station 604. In order to maintain mobility management and connectivity, the core network part 602 also includes a mobility management entity (not shown) which manages the enhanced packet service, EPS, connections with the terminal devices 606, 608 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 602 to an external packet data network, for example the Internet. As noted above, the operation of the various elements of the communications system 600 shown in FIG. 6 may be broadly conventional, for example in accordance with established telecoms standards and the principles set out in the referenced documents mentioned herein, apart from where modified to provide functionality in accordance with embodiments of the present disclosure as discussed herein.

In this example, it is assumed the first terminal device 606 is a conventional smartphone type terminal device communicating with the base station 604 in a conventional manner. This conventional terminal device 606 comprises a transceiver unit 606a for transmission and reception of wireless signals and a processor unit (controller unit) 606b configured to control the device 606. The processor unit 606b may comprise a processor unit which is suitably configured/programmed to provide the desired functionality using conventional programming/configuration techniques for equipment in wireless telecommunications systems. The transceiver unit 606a and the processor unit 606b are schematically shown in FIG. 6 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 606 will in general comprise various other elements associated with its operating functionality.

In this example, it is assumed the second terminal device 608 is a machine-type communication (MTC) terminal device 604 adapted to operate in a virtual carrier (VC) mode in accordance with embodiments of the present disclosure when communicating with the base station 604. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 608 in FIG. 6 is such a device.

The MTC device 608 comprises a transceiver unit 608a for transmission and reception of wireless signals and a processor unit (controller unit) 608b configured to control the MTC device 608. The processor unit 608b may comprise various sub-units for providing functionality in accordance with some embodiments of the present disclosure as explained further herein. These sub-units may be implemented as discrete hardware elements or as appropriately configured functions of the processor unit. Thus the processor unit 608b may comprise a processor which is suitably configured/programmed to provide the desired functionality described herein using conventional programming/configuration techniques for equipment in wireless telecommunications systems. The transceiver unit 608a and the processor unit 608b are schematically shown in FIG. 6 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 608 will in general comprise various other elements associated with its operating functionality in accordance with established wireless telecommunications techniques.

The base station 604 comprises a transceiver unit 604a for transmission and reception of wireless signals and a processor unit (controller unit) 604b configured to control the base station 604 to operate in accordance with embodiments of the present disclosure as described herein. The processor unit 606b may again comprise various sub-units for providing functionality in accordance with embodiments of the present disclosure as explained further below. These sub-units may be implemented as discrete hardware elements or as appropriately configured functions of the processor unit. Thus, the processor unit 604b may comprise a processor which is suitably configured/programmed to provide the desired functionality described herein using conventional programming/configuration techniques for equipment in wireless telecommunications systems. The transceiver unit 604a and the processor unit 604b are schematically shown in FIG. 6 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 604 will in general comprise various other elements associated with its operating functionality in accordance with established wireless telecommunications techniques.

Thus, the base station 604 is configured to communicate data with both the conventional terminal device 606 and the terminal device 608 according to an embodiment of the disclosure over respective communication links 610, 612. The communication link 610 for communications between the base station 604 and the conventional terminal device 606 is supported by a host carrier (e.g. potentially making use of the full range of transmission resources schematically represented in FIG. 4). The communication link 612 for communications between the base station 604 and the reduced-capability MTC terminal device 608 is supported by a virtual carrier (e.g. making use of resources within a restricted subset of frequency resources such as the virtual carrier schematically represented in FIG. 4). Communications between the MTC terminal device 608 and the base station 604 may generally be based on any of the previously proposed schemes for virtual carrier operation with modification as described herein to provide functionality in accordance with certain embodiments of the disclosure. For example, the MTC terminal device 608 may operate such that all control-plane and user-plane signalling from the base station 604 which is addressed to the terminal device 608 is made within the subset of frequency resources (OFDM carriers) allocated to the virtual carrier provided for the terminal device 608. Alternatively, control-plane signalling from the base station 604 which is addressed to the terminal device 608 may be made within the full-bandwidth of the control region 300 represented in FIG. 4, with higher-layer data (user-plane data) being communicated within the restricted frequency resources (OFDM carriers) allocated to the virtual carrier provided for the terminal device 608.

Figure 7:
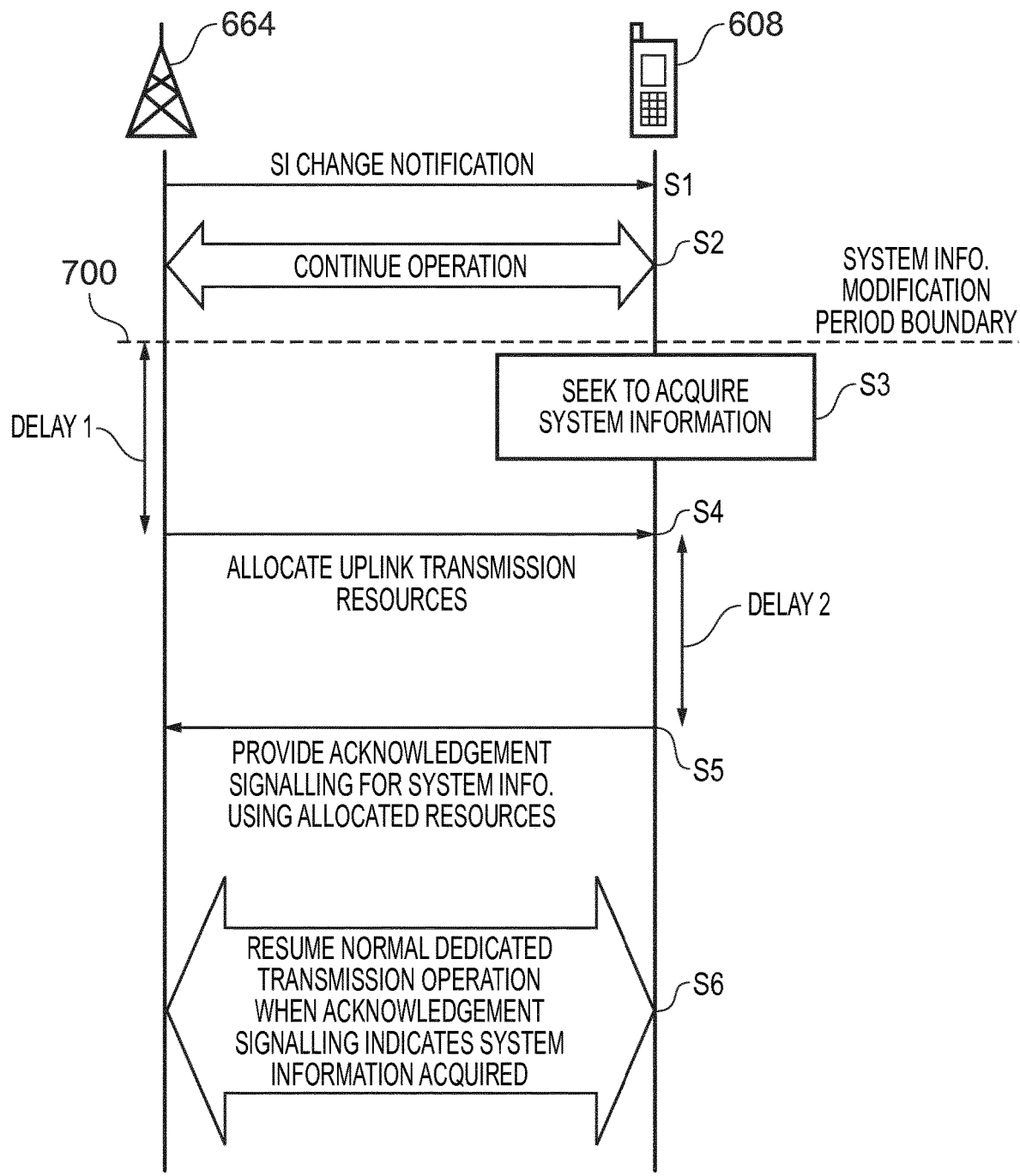
FIG. 7 is a signalling ladder-diagram schematically representing methods of operation in accordance with certain examples of the present disclosure.

FIG. 7 is a signalling ladder diagram schematically representing modes of operation for the terminal device 608 and the base station 604 schematically represented in FIG. 6 in accordance with some embodiments of the present disclosure.

In a first step S1 represented in FIG. 7 the base station 604 transmits a system information (SI) change (update) notification and this is received by the terminal device 608. The terminal device 608 in this example is assumed to be in RRC connected mode when the SI change notification is transmitted by the base station, for example because the terminal device 608 is in the process of receiving downlink data from the base station 604. The system information change notification may be transmitted on a paging channel in accordance with conventional techniques such as described above. The reason why the base station is updating the system information is not significant. Accordingly, at step S1 of the method represented in FIG. 7 the reduced-capability terminal device 608 receives from the base station 604 an indication that updated system information is to be broadcast by the base station.

In accordance with conventional techniques, the base station 604 is configured to start broadcasting the new updated system information from a time point corresponding to a system information modification period boundary following the SI change notification. The timing of the relevant SI modification period boundary is schematically represented in FIG. 7 by a dotted line 700.

After the transmission of the system information change notification in step S1, and prior to the SI modification period boundary 700 when the base station starts transmitting the new system information, communications between the base station 604 and the terminal device 608 may continue as normal, as schematically represented in step S2. That is to say, the base station 604 and terminal device 608 may continue communicating in accordance with the virtual carrier mode of operation being implemented in the wireless telecommunications network. In this example it is assumed the base station and the terminal device are using a T-shaped virtual carrier mode of operation, such as proposed in GB 2 497 743 [10] and GB 2 497 742 [11].

The terminal device 608 is, in accordance with conventional techniques, configured to seek to acquire the updated system information broadcast by the base station after the SI modification period boundary 700. This is schematically represented in FIG. 7 by step S3. While the terminal device is seeking to acquire the updated system information, its ability to receive user-plane data within the restricted subset of transmission resources is further restricted since at least a portion of the restricted frequency resources (virtual carrier) on which the terminal device 608 can receive relevant downlink transmissions are configured to coincide with the transmission resources used by the base station to broadcast the system information. That is to say, the terminal device starts to buffer the transmission resources used by the base station for transmitting system information following the system information modification period boundary 700. It may be noted the particular physical resource blocks comprising the restricted subset of transmission resources in a subframe in which the terminal device is seeking to acquire system information will not in general be the same as the physical resource blocks comprising the restricted subset of transmission resources used to receive dedicated transmissions in a subframe prior to the system information modification boundary 700. This is because the physical resources being received/buffered by the terminal device for dedicated transmissions will be specific to the terminal device, whereas the physical resources being received/buffered to seek to acquire system information will be the same as for other terminal devices. Accordingly, the base station is configured to further restrict user-plane data transmissions to the terminal device 608 from the system information modification period boundary 700. The extent of this restriction depends on how much of the restricted transmission resources available to the terminal device are required for conveying the system information change information. For example, if the terminal device 608 is only able to buffer six physical resource blocks of physical downlink shared channel resources, and the updated system information requires four of these physical resource blocks, the base station will restrict user-plane data transmissions (if currently any) to the remaining two physical resource blocks.

The base station is configured after a time delay (Delay 1 in FIG. 7) from the system information modification period boundary 700 to allocat uplink transmission resources to the terminal device 608, as schematically represented in FIG. 7 in step S4. This resource allocation may, for example, comprise an indication of uplink resources within a radio subframe of the uplink radio interface structure but without indicating any particular subframe. Instead, the terminal device 608 may be configured to assume the uplink resources are allocated in a subframe that is a predefined number of subframes after the subframe in which the uplink transmission resource allocation signalling is received in step S4. The uplink transmission resources may be on, for example, a physical uplink control channel or a physical uplink shared channel. In particular, the uplink transmission resource allocations may in some examples correspond with an area of a physical uplink control channel or a physical uplink shared channel reserved for acknowledgement signalling in the wireless telecommunications system.

As is well known, LTE-based wireless telecommunications systems employ a hybrid automatic repeat request (HARQ) retransmission protocol. The basic principle of HARQ is that in association with the transmission of a given block of data, for example in downlink from a base station (eNB) to a terminal device (UE), there is sent in the opposite direction (i.e. in this case uplink from the terminal device to the base station) some feedback (acknowledgement signalling) indicating whether the transmission was successfully received. Acknowledgement signalling indicating successful receipt of the associated transmission is commonly referred to as an 'ACK' while acknowledgement signalling indicating non-successful receipt of the associated uplink transmission is commonly referred to as a 'NACK'. In this regard it may be noted that the term "acknowledgment signalling" may be used herein as a convenient term for the feedback/response signalling regardless of whether the signalling is indicating successful receipt (ACK) or unsuccessful receipt (NACK). That is to say the term "acknowledgment signalling" is intended to encompass both positive acknowledgement signalling (ACK signalling) and negative acknowledgement signalling (NACK signalling). In this regard acknowledgement signalling may also be referred to as ACK/NACK signalling, feedback signalling and response signalling.

The terminal device 608 is configured after a time delay (Delay 2 in FIG. 7) corresponding to a predetermined number of subframes to transmit acknowledgement signalling to the base station using the allocated uplink transmission resources. This is schematically indicated in step S5. This acknowledgement signalling is used to indicate whether or not the terminal device has yet succeeded in acquiring the system information (i.e. whether or not step S3 has completed with system information being acquired).

If the acknowledgement signalling indication provided in step S5 indicates the terminal device 608 has successfully acquired the updated system information, terminal device specific communications between the base station 604 and the terminal device 608 may resume with the terminal device receiving dedicated transmissions without receiving system information transmissions, as schematically represented in step S6. That is to say, the base station 604 and terminal device 608 may communicate in accordance with the virtual carrier mode of operation being implemented in the wireless telecommunications network, and in particular without the base station further restricting user-plane transmissions for the terminal device within the already restricted subset of transmission resources comprising the virtual carrier to allow the terminal device to receive resource blocks on which system information is being broadcast.

Positive acknowledgement signalling therefore informs the base station the terminal device has successfully acquired the new system information and the base station (more particularly, the scheduling entity of the base station) is free from this point to allocate user-plane data for transmission to the terminal device using any of the restricted subset of frequency resources associated with the terminal device's reduced capability operation. Thus, in accordance with certain embodiments, on receiving positive acknowledgement signalling from a terminal device, the base station is again able to schedule dedicated transmissions on PDSCH resources other than the common PDSCH resources used for system information transmissions. The terminal device can return to an existing operating configuration for this (e.g. the configuration used in step S2 in FIG. 7), or may receive a new operating configuration for the resumption of normal (i.e. without simultaneously seeking to acquire system information) dedicated transmission operation represented in step S6 of FIG. 7.

If, on the other hand, the acknowledgement signalling indication provided in step S5 indicates the terminal device 608 has not yet successfully acquired the updated system information, the base station may continue to further restrict user-plane data transmissions to the terminal device to allow the terminal device more time to acquire updated system information. Thus, the base station may wait a further delay period, for example corresponding to Delay 1, or possibly a different delay period before allocating another uplink transmission resource to the terminal device in another step corresponding to step S4. Processing may then continue based on the new uplink transmission resource allocation in the same way as for the initial uplink transmission resource allocation represented in step S4 in FIG. 7 that was not positively acknowledged. That is to say, on receiving a subsequent allocation of uplink transmission resources the terminal device may again delay a period (Delay 2) before providing acknowledgement signalling to indicate whether or not the terminal device has yet successfully acquired the system information.

This process may be repeated until positive acknowledgement signalling is received by the base station to indicate the terminal device 608 has successfully received the updated system information or until a threshold number of attempts has been made. If the terminal device has failed to receive and positively acknowledge the after system information after a period corresponding to the threshold number of attempts has been made, it may be determined the terminal device is out of coverage and the system may react in accordance with conventional techniques to seek to re-establish connection with the terminal device.

Thus, the approach of FIG. 7 in effect provides a mechanism for allowing a terminal device to provide acknowledgement signalling in respect of system information broadcast by the base station to multiple terminal devices. The nature of the acknowledgement signalling, for example in terms of the specific time and frequency resources that may be allocated in step S4 and the protocols and format associated with the transmission of the acknowledgement signalling in step S5, may be based on conventional HARQ procedures associated with dedicated user-plane data transmissions in the wireless telecommunications system.

Approaches in accordance with certain embodiments of the disclosure such as represented in FIG. 7 may be referred to as an SI ACK/NACK approaches in that positive/negative acknowledgement signalling is provided in respect of system information broadcast to multiple terminal devices (e.g. transmitted on PDSCH resources address to a plurality of terminal devices as opposed to PDSCH resources dedicated for communicating with a specific terminal device). In general, all terminal devices which operate with a restricted PDSCH baseband bandwidth might be configured to use an SI ACK/NACK procedure such as described above, or the procedure might be activated for individual terminal devices by configuration information from the base station, and in this case the procedure could be disabled and re-enabled as desired.

As discussed above, in accordance with certain embodiments of the present disclosure a timer (corresponding to Delay 1 in FIG. 7) is established. This may be referred to as an SI ACK/NACK timer. A base station operating in accordance with certain embodiments of the disclosure is configured to allocate uplink transmission resources to a terminal device after a period corresponding to the SI ACK/NACK timer has elapsed following the start of transmission of updated system information. The terminal device is configured to provide an indication of whether system information has been acquired using the allocated transmission resources.

The duration of the SI ACK/NACK timer can be selected according to the implementation at hand. A longer SI ACK/NACK timer will give terminal devices more time to successfully acquire the updated system information, thereby resulting in fewer negative acknowledgements. A shorter SI ACK/NACK timer, on the other hand, can be expected to allow the base station to more quickly resume normal user-plane data transmissions with the terminal device (i.e. using a restricted subset of resources suitable to the terminal device's reduced capability operation for conveying dedicated information for the terminal device rather than for conveying system information).

In some examples the SI ACK/NACK timer used by the base station may be fixed for a plurality of terminal devices in the wireless telecommunications system, for example the same timer might apply for all reduced-capability terminal devices. In this case the SI ACK/NACK timer may be fixed according to a standard. However, to provide more flexibility, the base station may be able to select an appropriate SI ACK/NACK timer according to prevailing conditions. For example, the base station may be configured to set an SI ACK/NACK timer according to the duration that is expected to allow all the relevant terminal devices to have a good chance of receiving the updated system information by the time they receive the allocation of uplink transmission resources for providing their acknowledgement signalling. In accordance with this approach, the duration of the SI ACK/NACK timer can, for example, be set by estimating the number of system information repetition periods that will typically be required for a terminal device with the worst channel conditions in the cell (e.g. located at the cell edge) to successfully acquire all SIBs. In accordance with certain embodiments of the present disclosure, a terminal device which has successfully acquired the new SIBs before the expiry of the SI ACK/NACK timer and the corresponding grant of uplink resources for acknowledgement signalling (what might be referred to as SI-ACK/NACK resources) does not send the acknowledgement signalling until receiving the relevant allocation of resources (grant).

In some other embodiments the base station might be configured to use different terminal device specific delays for different terminal devices. For example, the base station may in effect wait for a terminal-device specific delay before allocating uplink transmission resources following a change in the system information being broadcast. This would allow the base station to take account of channel conditions for each terminal device. A relatively short SI ACK/NACK timer may be associated with a terminal device experiencing good channel conditions to help minimise the impact of the need to acquire updated system information on the ability of the terminal device to receive dedicated communications. A relatively long SI ACK/NACK timer may be associated with a terminal device experiencing relatively poor channel conditions to help increase the likelihood of the terminal device successfully acquiring the updated system information, for example using chase combining, before needing to provide acknowledgement signalling to the base station.

The base station may determine appropriate terminal device specific timer durations for Delay 1 represented in FIG. 7 using conventional channel condition measurement information. For example, in an LTE-based wireless telecommunications system the reference symbol received power (RSRP), reference symbol received quality (RSRQ) and/or channel quality indicator (CQI) information could be used as an indicator of channel conditions on which to base the SI ACK/NACK timer for an associated terminal device. Another approach would be to analyse the rate at which negative acknowledgement signalling, e.g. in respect of dedicated user-plane data downlink transmissions, has been received from the terminal device over a preceding period, or by reference to the operation of PDSCH/PDCCH in terms of coverage extension repetitions.

In some example embodiments of the present disclosure some terminal devices associated with a base station may be associated with terminal-device specific SI ACK/NACK timers while some other terminal devices associated with the base station may use a SI ACK/NACK timer that applies to a number of terminal devices. For example, the base station may employ a default SI ACK/NACK timer for all terminal devices, but have the ability to modify this for certain specific terminal devices. For example, a default SI ACK/NACK timer may be determined that is expected to allow the majority of terminal devices in a cell to successfully acquire updated system information before providing acknowledgement signalling. However, terminal devices which are experiencing particularly poor channel conditions may be associated with a longer SI ACK/NACK timer instead of the default SI ACK/NACK timer. Similarly, terminal devices which are experiencing particularly good channel conditions may be associated with a shorter SI ACK/NACK timer instead of the default SI ACK/NACK timer.

It will be appreciated the reception of system information may not require all the resources that are available within the restricted subset of transmission resources on which the terminal device is configured to receive data from the base station. That is to say, the system information transmissions may require less than the operating baseband bandwidth of the terminal device for the relevant downlink carrier or channel (e.g. PDSCH). In such circumstances, the base station may continue to schedule dedicated transmissions for the terminal device using transmission resources which are separate from those used to broadcast the system information. A wireless telecommunications system will typically operate a retransmission protocol for such dedicated transmissions to terminal devices and this will typically involve the terminal device providing acknowledgement signalling, such as for the conventional HARQ procedure discussed above for LTE-based telecommunications systems. In accordance with certain embodiments of the present disclosure various aspects of the acknowledgement signalling provided by a terminal device to indicate whether or not the terminal device has acquired system information may be based on corresponding aspects of conventional acknowledgement signalling for dedicated transmissions for terminal devices. For example, the format for the acknowledgement signalling transmitted in step S5 of FIG. 7 may correspond with the format of conventional acknowledgement signalling associated with dedicated user data.

Because in some implementations a base station may broadcast system information using some of the resources being decoded by a reduced-capability terminal device while simultaneously transmitting dedicated information for the terminal device using remaining resources, it can be helpful in some circumstances to adopt an approach which allows the base station to readily distinguish between conventional acknowledgement signalling associated with the terminal device specific transmissions (dedicated transmissions) and acknowledgement signalling associated with system information transmissions.

One approach to help a base station distinguish between conventional acknowledgement signalling associated with terminal device specific transmissions and acknowledgement signalling associated with system information transmissions is for different uplink resources to be used for the different types of acknowledgement signalling. For example, a pool of resources within a subframe available for conventional HARQ ACK/NACK acknowledgement signalling may be separate from a pool of resources within a subframe available for SI ACK/NACK acknowledgement signalling in accordance with certain embodiments of the present disclosure. Thus, in an LTE-based wireless telecommunications system, resource elements on PUSCH defined for use for conventional HARQ acknowledgement signalling may be different from resource elements on PUSCH defined for use by system information acknowledgement signalling. Resource indices for PUCCH for conventional HARQ acknowledgement signalling might similarly be different from resource indices for PUCCH for system information acknowledgement signalling in accordance with embodiments of the present disclosure. Such distinction might in some cases be drawn only during periods between when a system information change notification is broadcast and when a terminal device acknowledges successful acquisition of the system information. This prevents resources defined for system information acknowledgement signalling from being blocked for use by conventional acknowledgement signalling during periods when there has not been a new change in system information.

In accordance with the principles discussed above it has been assumed the system information is relevant to all terminal devices in the network. That is to say, the approaches described above may be applied for existing SIB transmissions in an LTE-based system where the SIB transmissions are received by conventional terminal devices and by reduced-capability terminal devices. However, it is possible that some wireless telecommunications systems may in future support system information that is only relevant for certain classes of terminal devices, for example reduced-capability terminal devices, such as machine type communication terminal devices. Similarly, there may be some system information that is not relevant for these terminal devices, but is relevant for other terminal devices, for example conventional full-capability terminal devices. In this case the above-described approaches for acknowledging system information may be applied only for system information which is relevant for reduced-capability terminal devices operating in a virtual carrier mode (i.e. with at least some types of transmission, e.g. user-plane data, being received with a reduced baseband as compared to an overall system bandwidth).

As noted above, the particular physical resource blocks comprising the restricted subset of transmission resources in a subframe in which the terminal device is seeking to acquire system information will not in general be the same as the physical resource blocks comprising the restricted subset of transmission resources used to receive dedicated transmissions in a subframe prior to the system information modification boundary or after the updated system information has been acquired. More generally still, the physical resource blocks comprising the restricted subset of transmission resources may be different in different subframes regardless of the nature of the information being communicated (e.g. regardless of whether the information is system information or terminal device specific information). For example, referring to FIG. 7, the physical resources used to provide the restricted-bandwidth downlink channel in step S2 will typically be different from those used in step S6, and indeed the physical resources comprising the restricted subset of resources may be different within different subframes within step S2 and/or step S6. Furthermore, the bandwidth of the downlink channel provided by the restricted subset of transmission resources may be different in different subframes.

Furthermore still, although the embodiments described above have focussed on examples in which the terminal device 608 is a reduced capability terminal device configured to receive at least some communications from the base station within a restricted subset of transmission resources selected from within the system frequency bandwidth and comprising a downlink channel (e.g. a physical downlink shared channel, such as PDSCH in an LTE-based network) having a bandwidth which is narrower than the system frequency bandwidth, the same principles may be applied for a terminal device which does not have a reduced capability in this respect. That is to say, the same principles may be applied for a terminal device that is able to receive the relevant communications on a channel spanning the full system bandwidth (i.e. not operating on a virtual carrier).

Thus there has been described a wireless telecommunications system that comprises a base station and a terminal device. The system supports a virtual carrier mode of operation in which downlink communications are made by the base station using a radio interface that spans a system frequency bandwidth while the terminal device is configured to receive at least some communications from the base station within a restricted subset of transmission resources selected from within the system frequency bandwidth (i.e. the terminal device receives at least some communication on a channel using a baseband bandwidth that is narrower than the system bandwidth). When there is to be a change in system information the base station transmits to the terminal device an indication that updated system information is to be broadcast by the base station to a plurality of terminal devices and the terminal device seeks to acquire the updated system information using the restricted subset of transmission resources. The base station further conveys to the terminal device an allocation of uplink transmission resources for acknowledgement signalling for the updated system information and the terminal device responds by using the allocated uplink transmission resources to convey to the base station an indication of whether or not the terminal device has acquired the updated system information. Providing a mechanism for the terminal device to feedback on whether the updated system information has been acquired can help address issues associated with managing the communication of both system information and user-plane data using the restricted subset of transmission resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Some respective features of the present disclosure are defined by the following two groups of numbered paragraphs:

First group of numbered paragraphs:

1. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, the method comprising: seeking to acquire updated system information broadcast by the base station to a plurality of terminal devices using the restricted subset of transmission resources; receiving an allocation of uplink transmission resources from the base station; and conveying to the base station using the allocated uplink transmission resources an indication of whether or not the terminal device has acquired the updated system information.

2. The method of paragraph 1, wherein the indication of whether or not the terminal device has acquired the updated system information is conveyed to the base station a fixed period of time after receiving the allocation of uplink transmission resources.

3. The method of paragraph 1 or 2, wherein the radio interface comprises a series of radio subframes and the indication of whether or not the terminal device has acquired the updated system information is conveyed to the base station a fixed number of subframes after receiving the allocation of uplink transmission resources.

4. The method of any of paragraphs 1 to 3, wherein the allocation of uplink transmission resources is received from the base station a predefined period of time after the base station starts to broadcast the updated system information.

5. The method of paragraph 4, wherein the predefined period of time is based on measurements of channel conditions associated with the terminal device.

6. The method of paragraph 4 or 5, wherein the predefined period of time is based on measurements of channel conditions associated with another terminal device operating in the wireless telecommunications system.

7. The method of any one of paragraphs 4 to 6, wherein the predefined period of time is fixed for a plurality of terminal devices in the wireless telecommunications system.

8. The method of any of paragraphs 1 to 7, further comprising receiving from the base station an indication that the updated system information is to be broadcast by the base station to a plurality of terminal devices.

9. The method of paragraph 8, wherein system information changes in the wireless telecommunications system are scheduled in accordance with a system information modification period, and wherein the terminal device seeks to acquire the updated system information from a time associated with a boundary of a system information modification period following the indication that updated system information is to be broadcast by the base station.

10. The method of any of paragraphs 1 to 9, wherein the uplink transmission resources allocated to the terminal device are from a pool of transmission resources which is different from a pool of uplink transmission resources used for acknowledgment signalling in respect of user-plane data received from the base station in association with a retransmission protocol for user-plane data in the wireless telecommunications system.

11. The method of any of paragraphs 1 to 10, wherein the radio interface comprises a series of subframes and the physical resources corresponding to the restricted subset of transmission resources may be different for different subframes.

12. The method of any of paragraphs 1 to 11, wherein the physical resources corresponding to the restricted subset of transmission resources used to transmit the updated system information are different from the physical resources corresponding to the restricted subset of transmission resources used for dedicated transmissions to the terminal device before the updated system information is broadcast by the base station.

13. The method of any of paragraphs 1 to 12, wherein the terminal device is a machine type communication, MTC, terminal device.

14. The method of any of paragraphs 1 to 13, wherein the terminal device is a first type of terminal device supported by the wireless telecommunications system, wherein the wireless telecommunications system further supports a second type of terminal device, and wherein the updated system information is relevant for the first type of terminal device and is not relevant for the second type of terminal device.

15. A terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, wherein the terminal device comprises: a controller unit configured to cause a transceiver unit to seek to acquire updated system information broadcast by the base station to a plurality of terminal devices using the restricted subset of transmission resources; to receive an allocation of uplink transmission resources from the base station; and to convey to the base station using the allocated uplink transmission resources an indication of whether or not the terminal device has acquired the updated system information.

16. A wireless telecommunications system comprising the terminal device of paragraph 15 and a base station.

Second group of numbered paragraphs:

1. A method of operating a base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a downlink channel having a channel bandwidth which is smaller than the system frequency bandwidth, the method comprising: broadcasting updated system information to a plurality of terminal devices using the restricted subset of transmission resources for the terminal device; transmitting an allocation of uplink transmission resources to the terminal device; and receiving from the terminal device using the allocated uplink transmission resources an indication of whether or not the terminal device has acquired the updated system information.

2. The method of paragraph 1, wherein the indication of whether or not the terminal device has acquired the updated system information is received by the base station a fixed period of time after transmitting the allocation of uplink transmission resources.

3. The method of paragraph 1 or 2, wherein the radio interface comprises a series of radio subframes and the indication of whether or not the terminal device has acquired the updated system information is received by the base station a fixed number of subframes after transmitting the allocation of uplink transmission resources.

4. The method of any of paragraphs 1 to 3, wherein the allocation of uplink transmission resources is transmitted from the base station a predefined period of time after the base station starts to broadcast the updated system information.

5. The method of paragraph 4, wherein the predefined period of time is based on measurements of channel conditions associated with the terminal device.

6. The method of paragraph 4 or 5, wherein the predefined period of time is based on measurements of channel conditions associated with another terminal device operating in the wireless telecommunications system.

7. The method of any of paragraphs 4 to 6, wherein the predefined period of time is fixed for a plurality of terminal devices in the wireless telecommunications system.

8. The method of any of paragraphs 1 to 7, further comprising transmitting from the base station an indication that the updated system information is to be broadcast by the base station to a plurality of terminal devices.

9. The method of paragraph 8, wherein system information changes in the wireless telecommunications system are scheduled in accordance with a system information modification period, and wherein the base station broadcasts the updated system information from a time associated with a boundary of a system information modification period following the indication that updated system information is to be broadcast by the base station.

10. The method of any of paragraphs 1 to 9, wherein the uplink transmission resources allocated to the terminal device are from a pool of transmission resources which is different from a pool of uplink transmission resources used for acknowledgment signalling in respect of user-plane data transmitted from the base station to the terminal device in association with a retransmission protocol for user-plane data in the wireless telecommunications system.

11. The method of any of paragraphs 1 to 10, further comprising restricting transmissions of user-plane data for the terminal device using the downlink channel from a time associated with when the base station starts broadcasting updated system information until a time after the base station receives from the terminal device an indication that the updated system information has been acquired by the terminal device.

12. The method of any of paragraphs 1 to 11, wherein the radio interface comprises a series of subframes and the physical resources corresponding to the restricted subset of transmission resources may be different for different subframes.

13. The method of any of paragraphs 1 to 12, wherein the physical resources corresponding to the restricted subset of transmission resources used to acquire the updated system information are different from the physical resources corresponding to the restricted subset of transmission resources used for dedicated transmissions to the terminal device before the updated system information is broadcast by the base station.

14. The method of any of paragraphs 1 to 13, wherein the terminal device is a machine type communication, MTC, terminal device.

15. The method of any of paragraphs 1 to 14, wherein the terminal device is a first type of terminal device supported by the wireless telecommunications system, wherein the wireless telecommunications system further supports a second type of terminal device, and wherein the updated system information is relevant for the first type of terminal device and is not relevant for the second type of terminal device.

16. A base station for use in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a downlink channel having a channel bandwidth which is smaller than the system frequency bandwidth, wherein the base station comprises: a controller unit configured to cause a transceiver unit to broadcast updated system information to a plurality of terminal devices using the restricted subset of transmission resources for the terminal device; to transmit an allocation of uplink transmission resources to the terminal device; and to receive from the terminal device using the allocated uplink transmission resources an indication of whether or not the terminal device has acquired the updated system information.

17. A wireless telecommunications system comprising the base station of paragraph 16 and a terminal device.

REFERENCES

[1] ETSI TS 122 368 V11.6.0 (2012-09)/3GPP TS 22.368 version 11.6.0 Release 11)
[2] GB 2 487 906 (UK patent application GB 1101970.0)
[3] GB 2 487 908 (UK patent application GB 1101981.7)
[4] GB 2 487 780 (UK patent application GB 1101966.8)
[5] GB 2 488 513 (UK patent application GB 1101983.3)
[6] GB 2 487 757 (UK patent application GB 1101853.8)
[7] GB 2 487 909 (UK patent application GB 1101982.5)
[8] GB 2 487 907 (UK patent application GB 1101980.9)
[9] GB 2 487 782 (UK patent application GB 1101972.6)
[10] GB 2 497 743 (UK patent application GB 1121767.6)
[11] GB 2 497 742 (UK patent application GB 1121766.8)
[12] Holma H. and Toskala A, "*LTE for UMTS OFDMA and SC-FDMA based radio access*", John Wiley and Sons, 2009
[13] ETSI TS 136 331 V11.4.0 (2013-07)/3GPP TS 36.331 version 11.4.0 Release 11)

What is claimed is:

1. A method of operating a terminal device in a wireless telecommunications system in which downlink communications are made by a base station using a radio interface that spans a system frequency bandwidth, the terminal device configured to receive at least some communications from the base station within a restricted subset of transmission resources selected from within the system frequency bandwidth, and the restricted subset of transmission resources comprising a downlink channel having a channel bandwidth which is smaller than the system frequency bandwidth, the method comprising:
seeking to acquire updated system information broadcast by the base station to a plurality of terminal devices using the restricted subset of transmission resources while in a radio resource control (RRC) connected mode with the base station;
receiving, from the base station, an allocation of uplink transmission resources within the restricted subset of transmission resources after a specific period of time that is specific to the terminal device and that is measured from a start of the base station broadcasting the updated system information, the allocation of uplink transmission resources being in which to transmit acknowledgement signaling according to a hybrid automatic repeat request (HARQ) procedure; and
conveying, to the base station and using the allocated uplink transmission resources, the acknowledgment signaling according to the HARQ procedure indicating whether or not the terminal device has acquired the updated system information, wherein
the base station determines the specific period of time according to channel condition measurement information associated with the terminal device,
while seeking to acquire the updated system information, the terminal device is restricted from receiving user-plane data within the restricted subset of transmission resources, and while seeking to acquire the updated system information, the terminal device buffers the transmission resources used by the base station for transmitting the updated system information from the start of the base station broadcasting the updated system information.

2. The method of claim 1, further comprising receiving, from the base station, an indication that the updated system information is to be broadcast by the base station to a plurality of terminal devices.

3. The method of claim 2, wherein
system information changes in the wireless telecommunications system are scheduled in accordance with a system information modification period, and
the terminal device seeks to acquire the updated system information from a time associated with a boundary of a system information modification period following the indication that updated system information is to be broadcast by the base station.

4. The method of claim 1, wherein the acknowledgment signaling is transmitted to the base station a fixed period of time after the terminal device receives the allocation of uplink transmission resources.

5. The method of claim 1, wherein the radio interface comprises a series of radio subframes and the acknowledgment signaling is conveyed to the base station a fixed number of subframes after the terminal device receives the allocation of uplink transmission resources.

6. The method of claim 1, wherein the base station further determines the specific period of time based on measurements of channel conditions associated with another terminal device operating in the wireless telecommunications system.

7. The method of claim 1, wherein the radio interface comprises a series of subframes and the physical resources corresponding to the restricted subset of transmission resources may be different for different subframes.

8. The method of claim 1, wherein the physical resources corresponding to the restricted subset of transmission resources used to transmit the updated system information are different from the physical resources corresponding to the restricted subset of transmission resources used for dedicated transmissions to the terminal device before the updated system information is broadcast by the base station.

9. The method of claim 1, wherein
the terminal device is a first type of terminal device supported by the wireless telecommunications system,
the wireless telecommunications system further supports a second type of terminal device, and
the updated system information is relevant for the first type of terminal device and is not relevant for the second type of terminal device.

10. A method of operating a base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth, the restricted subset of transmission resources comprising a downlink channel having a channel bandwidth which is smaller than the system frequency bandwidth, the method comprising:
broadcasting updated system information to a plurality of terminal devices using the restricted subset of transmission resources for the terminal device while in a radio resource control (RRC) connected mode with the terminal device;
determining a specific period of time, according to channel condition measurement information associated with the terminal device, that is specific to the terminal device and that is measured from a start of the base station broadcasting the updated system information;
transmitting, to the terminal device after the specific period of time, an allocation of uplink transmission resources within the restricted subset of transmission resources for the terminal device to transmit acknowledgement signaling according to a hybrid automatic repeat request (HARQ) procedure; and
receiving, from the terminal device using the allocated uplink transmission resources, the acknowledgment signaling according to the HARQ procedure indicating whether or not the terminal device has acquired the updated system information, wherein
while seeking to acquire the updated system information, the terminal device is restricted from receiving user-plane data within the restricted subset of transmission resources, and
while seeking to acquire the updated system information, the terminal device buffers the transmission resources used by the base station for transmitting the updated system information from the start of the base station broadcasting the updated system information.

11. The method of claim 10, wherein the acknowledgment signaling is received by the base station a fixed period of time after transmitting the allocation of uplink transmission resources.

12. The method of claim 10, wherein the radio interface comprises a series of radio subframes and the acknowledgment signaling is received by the base station a fixed number of subframes after transmitting the allocation of uplink transmission resources.

13. The method of claim 10, further comprising transmitting, from the base station, an indication that the updated system information is to be broadcast by the base station to a plurality of terminal devices.

14. The method of claim 10, further comprising restricting transmissions of user-plane data for the terminal device using the downlink channel from a time associated with when the base station starts broadcasting updated system information until a time after the base station receives from the terminal device acknowledgment signaling indicating that the updated system information has been acquired by the terminal device.

15. The method of claim 10, wherein the radio interface comprises a series of subframes and the physical resources corresponding to the restricted subset of transmission resources may be different for different subframes.

16. The method of claim 10, wherein the physical resources corresponding to the restricted subset of transmission resources used to acquire the updated system information are different from the physical resources corresponding to the restricted subset of transmission resources used for dedicated transmissions to the terminal device before the updated system information is broadcast by the base station.

17. A terminal device for use in a wireless telecommunications system in which downlink communications are made by a base station using a radio interface that spans a system frequency bandwidth, the terminal device comprising:
processing circuitry configured to
receive at least some communications from the base station within a restricted subset of transmission resources selected from within the system frequency bandwidth, the restricted subset of transmission resources comprising a downlink channel having a channel bandwidth which is smaller than the system frequency bandwidth;

control a transceiver to seek to acquire updated system information broadcast by the base station to a plurality of terminal devices using the restricted subset of transmission resources while in a radio resource control (RRC) connected mode with the base station;

receive, from the base station, an allocation of uplink transmission resources from the restricted subset of transmission resources after a specific period of time specific to the terminal device and that is that is measured from a start of the base station broadcasting the updated system information, the allocation of uplink transmission resources being in which to transmit acknowledgement signaling according to a hybrid automatic repeat request (HARQ) procedure indicating whether the updated system information has been successfully received; and convey, to the base station and using the allocated uplink transmission resources, the acknowledgment signaling according to the HARQ procedure indicating whether or not the terminal device has acquired the updated system information, wherein the base station determines the specific period of time according to channel condition measurement information associated with the terminal device, while the transceiver seeks to acquire the updated system information, the processing circuitry is restricted from receiving user-plane data within the restricted subset of transmission resources, and while the transceiver seeks to acquire the updated system information, the processing circuitry is configured to buffer the transmission resources used by the base station for transmitting the updated system information from the start of the base station broadcasting the updated system information.

18. A base station for use in a wireless telecommunications system in which downlink communications are made by the base station using a radio interface that spans a system frequency bandwidth, the base station comprising:

processing circuitry configured to transmit at least some communications to a terminal device within a restricted subset of transmission resources selected from within the system frequency bandwidth, the restricted subset of transmission resources comprising a downlink channel having a channel bandwidth which is smaller than the system frequency bandwidth;

control a transceiver to broadcast updated system information to a plurality of terminal devices using the restricted subset of transmission resources for the terminal device while in a radio resource control (RRC) connected mode with the terminal device;

determine a specific period of time, according to channel condition measurement information associated with the terminal device, that is specific to the terminal device and that is measured from a start of the base station broadcasting the updated system information;

transmit, to the terminal device after the specific period of time, an allocation of uplink transmission resources within the restricted subset of transmission resources for the terminal device to transmit acknowledgement signaling according to a hybrid automatic repeat request (HARQ) procedure; and receive, from the terminal device using the allocated uplink transmission resources, the acknowledgment signaling according to the HARQ procedure indicating whether or not the terminal device has acquired the updated system information, wherein while seeking to acquire the updated system information, the terminal device is restricted from receiving user-plane data within the restricted subset of transmission resources, and while seeking to acquire the updated system information, the terminal device buffers the transmission resources used by the base station for transmitting the updated system information from the start of the base station broadcasting the updated system information.

* * * * *